ately embodiments of the invention possess the inherent applied use characteristic of exerting an anorexigenic effect in man for prolonged periods of time without inducing undesirable side reactions, as evidenced by clinical evaluation. These embodiments are particularly advantageous for use as anorexigenic agents throughout the full day without interference with normal sleep patterns.

United States Patent Office 3,489,840
Patented Jan. 13, 1970

3,489,840
METHOD FOR REDUCING APPETITE WITH L-(+)-N-FORMYL-1-PHENYL-2-AMINOPROPANE
Chester John Cavallito and Allan Poe Gray, Decatur, Ill., assignors, by mesne assignments, to Mallinckrodt Chemical Works, St. Louis, Mo., a corporation of Missouri
No Drawing. Original application July 16, 1962, Ser. No. 211,151. Divided and this application July 6, 1965, Ser. No. 477,630
Int. Cl. A61k 27/00
U.S. Cl. 424—324
1 Claim

ABSTRACT OF THE DISCLOSURE

Appetite in humans is reduced by administering, free from the D form, L-1-phenyl-2-aminopropane having one substituent on the amino nitrogen which is formyl, carbo-lower-alkoxy or carbo-lower-thioalkoxy, and another which is hydrogen or methyl.

This is a divisional of S.N. 211,151, filed July 16, 1962, and now abandoned.

This invention relates to compositions of matter classified in the art of chemistry as substituted 1-phenyl-2-aminopropanes and to processes for making and using such compositions.

The invention sought to be patented, in its composition aspect, is described as residing in the concept of a chemical compound having a molecular structure in which there is attached, to the nitrogen atom of 1-phenyl-2-aminopropane of the L configuration free from the D configuration, a member selected from the group consisting of formyl, cargo-lower-alkoxy and carbo-lower-thioalkoxy, and wherein the other amino hydrogen may be replaced by methyl.

The invention sought to be patented, in its process of use aspect, is described as residing in the concept of administering to obese humans, to effect a reduction in appetite, the tangible embodiment of the aforesaid composition of matter.

The invention sought to be patented, in its process of making aspect, is described as residing in the concept of making a composition of matter having the molecular structure L-(+)-N-formyl-1-phenyl-2-aminopropane by heating L-(−)-1-phenyl-2-aminopropane with an N-formylating agent such as formic acid, ethyl formate or similar formate esters, chloral hydrate, chloral, or, bromal.

The invention sought to be patented, in an alternate process of making aspect, is described as residing in the concept of making a composition of matter having the molecular structure L-N-carbo-lower-alkoxy or L-N-carbo-lower-thioalkoxy-1-phenyl-2-aminopropane by reacting, in the presence of alkali, L-1-phenyl-2-aminopropane with the chloroformate or chlorothiolformate ester, respectively, of an alkanol having less than 4 carbon atoms.

The invention sought to be patented, in another alternate process of making aspect, is described as residing in the concept of making a composition of matter having the molecular structure L-N-carbo-lower-alkoxy or L-N-carbo-lower-thioalkoxy-1-phenyl-2-aminopropane by reacting L-1-phenyl-2-aminopropane in the cold with phosgene or thiocarbonyl chloride, respectively, followed by an alkanol having less than 4 carbon atoms.

The tangible embodiments of the composition aspect of the invention posses the inherent general physical properties of being optically active high-boiling liquids or low melting solids.

As used herein, the terms "carbo-lower-alkoxy," and "carbo-lower-thioalkoxy" refer to carbo-alkoxy and carbo-thioalkoxy radicals having a lower-alkyl group containing less than 4 carbon atoms. The alkyl portion of the alkoxy and thioalkoxy radicals may be straight chain or branched. Suitable constituents of the alkyl portion would include methyl, ethyl, propyl and isopropyl.

The manner and process of making and using the invention will now be generally described so as to enable a person skilled in the art of chemistry to make and use the same, as follows:

The compounds of this invention are most conveniently prepared starting with L-(−)-1-phenyl-2-aminopropane. The prefix "L" indicates the compound to have the "L" absolute configuration related to L-alanine as assigned by Karrer et al., Helvetica Chemica Acta 34, 2202 (1953). The minus sign in parenthesis indicates that the compound is levorotatory to polarized light. While the direction of rotation may change in a particular derivative, all of the compounds of this invention maintain the "L" configuration and are substantially free from the corresponding stereoisomer of the "D" configuration. As an illustration, L-(+)-N-formyl-1-phenyl-2-aminopropane is dextrorotatory (d) and is prepared from L-(−)-1-phenyl-2-aminopropane which is levorotatory (l). It is recognized that it is a practical impossibility to provide one stereoisomer totally free of the other. The term "substantially free" from the D stereoisomer means that there is an insufficient amount of the D form impurity to exert the central nervous system stimulant effects typically of D-(+)-1-phenyl-2-aminopropane.

The N-formyl derivatives are most conveniently prepared by condensation of L-(−)-1-phenyl-2-aminopropane, or its N-methyl derivative with formic acid, a formic ester, chloral, chloral hydrate or bromal. The condensation with formic acid is conveniently effected in the presence of a non-reactive azeotroping hydrocarbon at the reflux temperature of the hydrocarbon. The product is then worked up in a conventional manner.

The N-carbo-lower-alkoxy and carbo-lower-thioalkoxy derivatives are most conveniently prepared by the condensation of L-(−)-1-phenyl-2-aminopropane, or its N-methyl derivative with the chloroformate or chlorothiolformate ester, respectively, of an alkanol having less than 4 carbon atoms, i.e., methyl, ethyl, propyl or isopropyl alcohol with ethyl alcohol being preferred. The condensation is effected in the presence of alkali, either an inorganic base such as sodium hydroxide or sodium carbonate or an organic base such as a trialkylamine or pyridine under heat or cooling as appropriate, depending on the relative reactivity of the particular reactants employed. After the reaction is complete, the product is isolated in a conventional manner.

Alternatively, the N-carbo-lower-alkoxy and carbo-lower-thio-alkoxy derivatives can be prepared by the reaction of L-(−)-1-phenyl-2-aminopropane, or its N-methyl derivative with an approximately equivalent amount of phosgene or thiocarbonyl chloride, respectively, followed by a slight stoichiometric excess of an alkanol having less than 4 carbon atoms such as described in the preceding paragraph. Both the reaction with the carbonyl chloride and with the alkanol are effected in the cold. Work up and purification are conventional as described above.

The compositions of this invention possess the desired inherent use characteristic of suppressing appetite in animals, and particularly in humans, without exhibiting the undesired central nervous system stimulation and cardiovascular effects of their corresponding stereoisomers of the "D" configuration. Table I summarizes typical results obtained with dogs and mice.

amples 1–3, but substitute L-(−)-N-methyl-1-phenyl-2-aminopropane for L-(−)-1-phenyl-2-aminopropane to obtain L-(−)-N-formyl-N-methyl-1-phenyl-2-aminopropane as a colorless oil.

EXAMPLE 5

L-(+)-N-carbethoxy-1-phenyl-2-aminopropane

Add a solution of 6 grams of sodium hydroxide in 35 milliliters of water to a solution of 15.0 grams of L-(−)-1-phenyl-2-aminopropane sulfate in 50 milliliters of toluene cooled to 5 to 10 degrees. Over a 15 minute period,

TABLE I

| | Anorexigenic activity (dogs) | | Central nervous system stimulant activity | | | |
|---|---|---|---|---|---|---|
| | | | Dogs | | Mice | |
| | Oral dose, mg./kg. | Degree 0–4* | Oral dose | Degree 0–4* | I. P. dose | Degree, 0–4* |
| D-amphetamine | 1 | 4+ | 1 | 2+ | | |
| | 2.5 | 4+ | 2.5 | 4+ | 2.5 | 4+ |
| D-(−)-N-formyl-1-phenyl-2-aminopropane | 2.5 | 3+ | 2.5 | 3+ | | |
| | 5 | 4+ | 5 | 3+ | 5 | 4+ |
| L-(+)-N-formyl-1-phenyl-2-aminopropane | 2.5 | 2+ | 2.5 | 0 | | |
| | 5 | 4+ | 5 | 0 | 5 | 0 |
| L-(+)-N-carbethoxy-1-phenyl-2-aminopropane | + 2.5 | 1+ | | | 10 | 0 |
| | 5 | 4+ | 5 | 0 | 5 | 0 |
| L-(+)-N-carbethio-1-phenyl-2-aminopropane | 5 | 2+ | 5 | 0 | 5 | 0 |

*An "0" value for the anorexigenic and the central nervous stimulant activities means that no activity of the indicated category was shown. For the anorexigenic activity, the values of 1+ to 4+ are all relative reductions in food intake based on 4+ as a 100 percent reduction, or no food intake. For the central nervous system stimulant activity, the values of 1+ to 4+ are all related to the voluntary motor activity, 4+ being the greastest increase over normal and all other motor activities are proportional thereto.

All temperatures reported herein are degrees centigrade.

EXAMPLE 1

L-(+)-N-formyl-1-phenyl-2-aminopropane

Dissolve 433 grams of L-(−)-1-phenyl-2-aminopropane in one liter of benzene and cool in an ice bath. Slowly add 327 grams of 90 percent formic acid to the cooled, stirred solution. Remove the flask from the ice bath and connect to a Dean-Stark moisture apparatus. Stir the solution and reflux to remove the water formed in the reaction. Cool the solution and wash once with water, once with 3 percent hydrochloric acid, and repeat the washing with water. Dry the solution over sodium sulfate and concentrate on a steam bath in vacuo. Distill the residual oil at 118–121 degrees at 0.1 millimeter of mercury pressure to give 465 grams, or a 90 percent yield, of L-(+)-N-formyl-1-phenyl-2-aminopropane. The liquid solidifies upon cooling to give a solid melting at 49–51 degrees, $[\alpha]_D^{25} = +21.3 \pm 0.5$ degrees, concentration equals 5 percent in dioxane.

Analysis.—Calculated for $C_{10}H_{13}NO$: C, 73.59%; H, 8.03%; saponification equivalent, 163.2. Found: C, 73.81%; H, 7.79%; saponification equivalent, 169.5.

EXAMPLE 2

L-(+)-N-formyl-1-phenyl-2-aminopropane

Boil for five hours under reflux a mixture of equivalent amounts of chloral hydrate and L-(−)-1-phenyl-2-aminopropane in benzene contained in a flask connected to a modified Dean-Stark moisture apparatus to remove water formed in the reaction. Wash with water, dry the solution over sodium sulfate and concentrate on a steam bath in vacuo. Distill the residue at 0.15 millimeter of mercury pressure to obtain the product, L-(+)-N-formyl-1-phenyl-2-aminopropane, having physical properties identical to those of the material produced in Example 1.

EXAMPLE 3

L-(+)-N-formyl-1-phenyl-2-aminopropane

Use essentially the same procedure as shown in Example 2, but substitute bromal for chloral to obtain the product L-(+)-N-formyl-1-phenyl-2-aminopropane.

EXAMPLE 4

L-(−)-N-formyl-N-methyl-1-phenyl-2-aminopropane

Use essentially the same procedures as shown in Exadd 11.1 grams of ethyl chloroformate to the cooled mixture. Stir the mixture for 15 minutes at ice-bath temperature. Extract the mixture with ether, dry the ether extract over magnesium sulfate and concentrate on a steam bath in vacuo. Recrystallize the residue from hexane to give 8.6 grams, or a 52 percent yield, of L-(+)-N-carbethoxy-1-phenyl-2-aminopropane melting at 47.4–48.2 degrees $[\alpha]_D^{22} = +10.6 \pm 0.5$ degrees, concentration equals 4 percent in dioxane.

Analysis.—Calculated for $C_{12}H_{17}NO_2$: C, 69.54%; H, 8.27%; N, 6.76%. Found: C, 69.27%; H, 8.13%; N, 6.80%.

EXAMPLE 6

L-(+)-N-carbethoxy-1-phenyl-2-aminopropane

Treat an ice-cold methylene chloride solution of L-(−)-1-phenyl-2-aminopropane with an equivalent amount of phosgene and then with a slight excess of ethanol. Obtain L-(+)-N-carbethoxy-1-phenyl-2-aminopropane having physical properties essentially identical with those of the material produced in Example 5.

EXAMPLE 7

L-N-carbethoxy-N-methyl-1-phenyl-2-aminopropane

Use essentially the same procedure as shown in Example 5 but substitute L-(−)-N-methyl-1-phenyl-2-aminopropane for L-(−)-1-phenyl-2-aminopropane to obtain the product L-N-carbethoxy-N-methyl-1-phenyl-2-aminopropane.

EXAMPLE 8

L-(+)-N-carbethio-1-phenyl-2-aminopropane

Dissolve 13.5 grams of L-(−)-1-phenyl-2-aminopropane in 50 milliliters of ether and add the solution over a 30 minute period to a boiling solution of 12.5 grams of ethyl chlorothiolformate and 10.1 grams of triethylamine in 250 milliliters of ether. Stir the resultant mixture for an additional 90 minute period and remove the precipitated triethylamine hydrochloride by filtration. Wash the ether filtrate with dilute hydrochloric acid, dry over sodium sulfate and concentrate on a steam bath at reduced pressure. Recrystallize the residue from hexane to yield 12.0 grams, or a 54 percent yield, of L-(+)-N-carbethio-1-phenyl-2-aminopropane, melting at 42.6–43.6 degrees,

[α]$_D^{22}$=20.7±5.0 degrees, concentration equals 4 percent in dioxane.

*Analysis.*—Calculated for $C_{12}H_{17}NOS$: C, 64.53%; H, 7.67%; S, 14.36%. Found: C, 64.91%; H, 7.91%; S, 14.66%.

EXAMPLE 9

L-N-carbethio-N-methyl-1-phenyl-2-aminopropane

Use essentially the same procedure as shown in Example 8, but substitute L-(—)-N-methyl-1-phenyl-2-aminopropane for L-(—)-1-phenyl-2-aminopropane to obtain the product L-N-carbethio-N-methyl-1-phenyl-2-aminopropane.

The efficacy of the compounds of this invention as anorexigenic agents was evaluated by a clinician. The evaluation method consisted of using obese patients from two sources. The first were ambulatory patients seen in the clinician's office and who had been used before for various types of observations and were known to be resistant to weight loss. The other group of patients consisted of fifteen females were were seen in a reducing salon and were basically healthy except for the obesity and the psychological problems that accompany it. A third set consisted of ten non-obese, hypertensive patients who were studied to determine whether or not the test compound complicated hypertension or in any way altered or modified it.

All patients were placed on 7.5 milligrams of L-(+)-N-formyl-1-phenyl-2-aminopropane four times a day. The dosage was arranged so as to come in the morning, about noon, in the afternoon, and late in the evening between 8 and 10 o'clock. The latter was considered to be a severe test of the insomnia producing characteristics of the test compound.

All patients were given careful physical examinations and histories taken prior to the time of the study. No attempt was made to select the patients because of size, age or the like, but they were simply determined to have been obese under usual considerations for their height and weight. The hypertensive patients were those that were generally considered to be suffering from vascular hypertension. Many of them have been used for other studies in hypertensive control, and were well known both in their response and their general ability to use certain types of madications.

The results were observed in a very simple fashion. The patients were weighed each week after starting and this information was utilized to modify or to alter the course of treatment, if necessary. Generally, this was not necessary. Laboratory work done on the patients prior to the time of the onset of our study, during it, and at its conclusion were carefully recorded. These laboratory results consisted of complete blood studies, urine studies, BUN and SGOT.

The patients lost weight steadily. This was helped by encouragement and by placing the patients on a 1200 calorie diet. However, the patients stated in every case that the medicine helped them to refrain from eating. The average weight loss for the group of patients from the reducing salon was 2 pounds per week. Those seen in the clinician's office lost a little more, on the average of about 2 to 2.5 pounds per week.

The hypertensive patients were able to take the test compound without any increase in blood pressure.

Toxicity of the drug was remarkably absent. No jitteriness, nervousness, tension, anxiety, or insomnia was noticed. Two patients that stated they had had severe trouble taking any type of medication reported that they were unable to sleep and had difficulty with the drug. It was noticed, however, that when these patients were switched to a placebo, that they had exactly the same problems. In spite of the fact that the drug was given often late in the evening, there was no insomnia reported. The urines, the bloods, the BUN and the SGOT all remained normal throughout the study. There were no rashes, no dizziness, no vomiting, no diarrhea, or any other manifestations of toxicity seen in the study. The hypertensive patients were able to take the test compound without any increase in blood pressure and without any manifestations of toxicity.

The subject matter which the applicants regard as their invention is particularly pointed out and claimed as follows.

We claim:

1. The process of reducing appetite in overweight humans which comprises the administration to overweight humans in dosage form an effective amount sufficient to suppress their appetite of L-(+)-N-formyl-1-phenyl-2-aminopropane.

References Cited

FOREIGN PATENTS 599,932  6/1960  Canada.

OTHER REFERENCES

Karrer: Organic Chemistry, 2nd ed., English ed., pp. 92–102 (1946).

Shapiro et al.: II, Jour. Amer. Chem. Soc., vol. 80, pp. 6065–6071 (1958).

ALBERT T MEYERS, Primary Examiner

S. J. FRIEDMAN, Assistant Examiner